US011715233B2

(12) United States Patent
Woo et al.

(10) Patent No.: US 11,715,233 B2
(45) Date of Patent: Aug. 1, 2023

(54) MOBILITY DEVICE AND CONTROL METHOD THEREOF

(71) Applicants: Hyundai Motor Company, Seoul (KR); Kia Corporation, Seoul (KR)

(72) Inventors: Jae Yul Woo, Seoul (KR); Soobin Kim, Seoul (KR); Seunghyun Woo, Seoul (KR); Rowoon An, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/454,413

(22) Filed: Nov. 10, 2021

(65) Prior Publication Data
US 2022/0351409 A1 Nov. 3, 2022

(30) Foreign Application Priority Data
Apr. 30, 2021 (KR) .................. 10-2021-0056504

(51) Int. Cl.
*G06T 7/73* (2017.01)
*G01S 19/48* (2010.01)

(52) U.S. Cl.
CPC ............. *G06T 7/73* (2017.01); *G01S 19/48* (2013.01); *G06T 2207/30204* (2013.01); *G06T 2207/30252* (2013.01)

(58) Field of Classification Search
CPC .......... G06F 3/011; G06F 3/012; G06F 3/013; G06T 19/006; G09G 2354/00; G09G 2380/12; G09G 5/10; G09G 5/37
See application file for complete search history.

(56) References Cited

U.S. PATENT DOCUMENTS 10,323,947 B2 * 6/2019 Mishina ................ G01S 19/47
2018/0225875 A1 8/2018 Yarebi
(Continued)

FOREIGN PATENT DOCUMENTS

CN 106405605 B 4/2019
CN 111038524 A * 4/2020 ............ B60W 10/06
(Continued)

OTHER PUBLICATIONS

Lee, Gunwoo et al., "A Hybrid Marker-Based Indoor Positioning System for Pedestrian Tracking in Subway Stations", Applied Sciences, MDPI, Korea, Oct. 2020, 20 pages.
(Continued)

*Primary Examiner* — Ming Wu
(74) *Attorney, Agent, or Firm* — Slater Matsil, LLP

(57) ABSTRACT

An embodiment mobility device includes a position detector configured to detect a first current position of the mobility device, a display configured to display position information of the mobility device, and a controller configured to set the first current position of the mobility device detected by the position detector as first position information, identify an augmented reality (AR) marker in a predetermined range, based on the first position information, determine a second current position of the mobility device based on the identified AR marker, and set the second current position of the mobility device determined based on the identified AR marker as second position information, and determine final position information of the mobility device by applying the second position information to the first position information.

17 Claims, 5 Drawing Sheets

(56) References Cited

U.S. PATENT DOCUMENTS

| | | | |
|---|---|---|---|
| 2019/0033867 A1* | 1/2019 | Sharma | G01C 21/26 |
| 2019/0130597 A1* | 5/2019 | Suzuki | G01C 21/26 |
| 2019/0179033 A1* | 6/2019 | Sasaki | G01S 19/37 |
| 2020/0126423 A1 | 4/2020 | Li et al. | |
| 2021/0049925 A1* | 2/2021 | Robinson | G09B 9/206 |
| 2021/0197859 A1* | 7/2021 | Canady | B60W 60/0015 |

FOREIGN PATENT DOCUMENTS

| | | |
|---|---|---|
| JP | 2011013075 A | 1/2011 |
| KR | 101700681 B1 | 2/2017 |

OTHER PUBLICATIONS

Weng, Edmund Ng Giap et al., "Objects tracking from natural features in mobile augmented reality", Elsevier Procedia Social and Behavioral Sciences 97, www.sciencedirect.com, Oct. 2013, 8 pages.

\* cited by examiner

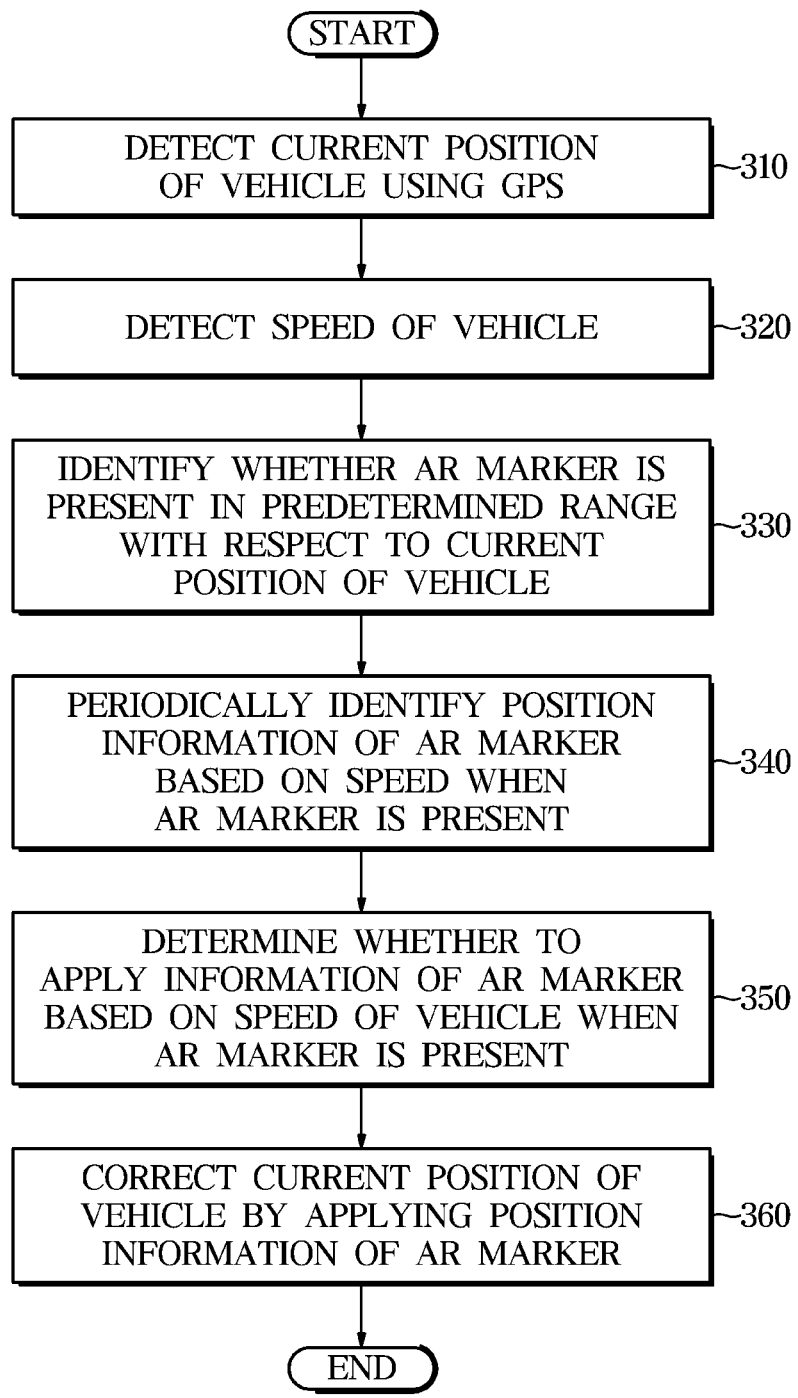

MOBILITY DEVICE AND CONTROL METHOD THEREOF

CROSS-REFERENCE TO RELATED APPLICATIONS

This application claims the benefit of Korean Patent Application No. 10-2021-0056504, filed on Apr. 30, 2021, which application is hereby incorporated herein by reference.

TECHNICAL FIELD

The disclosure relates to a mobility device and a control method thereof.

BACKGROUND

An augmented reality (AR) service is a service that provides highlights and additional information by identifying a current position of a client device (e.g., a mobile mobility device) and using a relative distance to an object.

However, a Global Positioning System (GPS), which is currently most widely used to identify a position of a client device, has a disadvantage in that it is difficult to accurately determine a position indoors, underground, or in a region with many tall buildings. In addition, it is confirmed that a method, which is to determine a position using a cumulative integral value among buildings with a large difference in height, has a larger error range compared to an actual position.

Further, another method such as a Visual Positioning Service (VPS) based on video, wireless LAN, etc. has limitations in application to mobility devices due to speed and network problems.

SUMMARY

Therefore, an embodiment of the disclosure provides a mobility device capable of providing a method configured to implement a more accurate positioning algorithm by merging a Global Positioning System (GPS) technology and an augmented reality (AR) environment technology to be mutually complementary.

Particularly, when a mobility device drives at a low speed, it is possible to more accurately correct a current position of the mobility device by applying position information of the mobility device, which is based on a position of an AR marker using an AR environment technology, to position information of the mobility device using a GPS.

Additional embodiments of the disclosure will be set forth in part in the description which follows and, in part, will be obvious from the description, or may be learned by practice of the disclosure.

In accordance with an embodiment of the disclosure, a mobility device includes a position detector configured to detect a current position of the mobility device, a display configured to display position information of the mobility device, and a controller configured to set the current position of the mobility device detected by the position detector as first position information, configured to identify an augmented reality (AR) marker in a predetermined range, based on the first position information, configured to determine a current position of the mobility device based on the identified AR marker, and set the current position of the mobility device, which is determined based on the identified AR marker, as second position information, and configured to determine final position information of the mobility device by applying the second position information to the first position information.

The mobility device may further include a speed detector configured to detect a speed of the mobility device.

When the AR marker is present, the controller may be configured to determine position information corresponding to the AR marker.

When the AR marker is present, the controller may be configured to periodically determine position information of the AR marker.

When the speed of the mobility device is less than or equal to a predetermined speed, the controller may be configured to correct the first position information by applying the second position information to the first position information.

When the mobility device is in a stopped state, the controller may be configured to correct the first position information by applying the second position information to the first position information.

The controller may be configured to determine an accuracy of the first position information and the second position information and configured to control the display to display position information with a high accuracy, based on the accuracy.

When receiving a selection input, which is to select at least one of the first position information and the second position information, from a user, the controller may be configured to control the display to display the at least one of the first position information and the second position information in accordance with the selection input of the user.

In accordance with another embodiment of the disclosure, a control method of a mobility device includes setting a current position of the mobility device detected by a position detector of the mobility device as first position information, identifying an augmented reality (AR) marker in a predetermined range, based on the first position information, determining a current position of the mobility device based on the identified AR marker, and setting the current position of the mobility device, which is determined based on the identified AR marker, as second position information, and determining final position information of the mobility device by applying the second position information to the first position information.

The control method may further include detecting a speed of the mobility device.

The control method may further include, when the AR marker is present, determining position information corresponding to the AR marker.

The control method may further include, when the AR marker is present, periodically determining position information of the AR marker.

The control method may further include, when the speed of the mobility device is less than or equal to a predetermined speed, correcting the first position information by applying the second position information to the first position information.

The control method may further include, when the mobility device is in a stopped state, correcting the first position information by applying the second position information to the first position information.

The control method may further include determining an accuracy of the first position information and the second position information, and displaying position information with a high accuracy, based on the accuracy.

The control method may further include, when receiving a selection input, which is to select at least one of the first position information and the second position information, from a user, displaying the at least one of the first position information and the second position information in accordance with the selection input of the user.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 5 is a flowchart illustrating a method for determining position information of the mobility device according to another embodiment of the disclosure.

DETAILED DESCRIPTION OF ILLUSTRATIVE EMBODIMENTS

Figure 1:
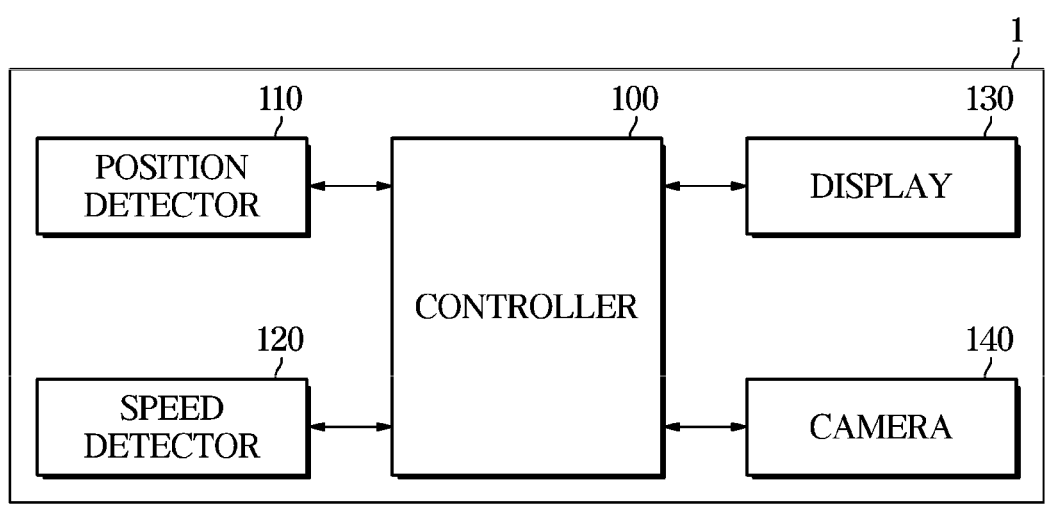
FIG. 1 is a control block diagram of a mobility device according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "units", "modules", "members", and "blocks" may be implemented as a single component or a single "unit", "module", "member", and "block" may include a plurality of components.

It will be understood that when an element is referred to as being "connected" to another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, the specification should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. Each step may be implemented in an order different from the illustrated order unless the context clearly indicates otherwise.

The disclosure will be described more fully hereinafter with reference to the accompanying drawings.

FIG. 1 is a control block diagram of a mobility device according to an embodiment of the disclosure.

As illustrated in FIG. 1, a mobility device 1, e.g., a vehicle, may include a position detector 110 configured to detect a current position of the mobility device 1, a display 130 configured to display position information of the mobility device 1, and a controller 100 configured to set the current position of the mobility device 1, which is detected by the position detector 110, as first position information, configured to identify whether an augmented reality (AR) marker is present in a predetermined range based on the first position information, configured to, when the AR marker is present, determine a current position of the mobility device 1 based on position information corresponding to the AR marker, configured to set the current position of the mobility device 1 as second position information, and configured to determine final position information of the current mobility device 1 by applying the second position information to the first position information. The mobility device 1 may further include a speed detector 120 configured to detect a current speed of the mobility device 1.

The position detector 110 may include a Global Positioning System (GPS), an Inertial Measurement Unit (IMU), and a 6 Degrees of Freedom (6DoF) sensor, but is not limited thereto.

The controller 100 may obtain current position information of the mobility device 1 using the GPS. In this case, the controller 100 may set the current position information of the mobility device 1 obtained using the GPS as the first position information.

The controller 100 may determine whether the AR marker is present within the predetermined range based on the first position information (the current position information obtained through the position detector 110). Particularly, the controller 100 may obtain a surrounding image of the mobility device 1 through a camera 140.

When the AR marker is present in the obtained surrounding image, the controller 100 may extract the AR marker.

The controller 100 may determine position information corresponding to the extracted AR marker. Particularly, the controller 100 may compare spatial information provided on a navigation system with the position information corresponding to the AR marker. Based on the comparison result, the controller 100 may determine current position information of the mobility device 1 using the AR marker. In this case, the controller 100 may set the current position information of the mobility device 1, which is determined using the AR marker, as the second position information.

The controller 100 may correct the current position information of the mobility device 1 by applying the second position information (i.e., the current position information of the mobility device 1 determined using the position information corresponding to the AR marker) to the first position information (i.e., the current position information of the mobility device 1 detected using the GPS).

When the AR marker is not present in the surrounding image, the controller 100 may set the first position information, which is the position information of the mobility device 1 detected by using the GPS, as the final position information.

Based on the corrected final position information, the controller 100 may control the navigation system to start a route guidance.

Providing a route and road information by the navigation system may be performed by obtaining current position information of the mobility device 1 using the GPS mounted to the mobility device 1 and by implementing the position information on a navigation map.

In addition, when the navigation system is in a region where GPS signal reception of the mobility device 1 is impossible (e.g., indoors, underground, a region with many high buildings, etc.), the mobility device 1 may implement the AR environment and extract the AR marker, and thus the navigation system may receive the position information of the mobility device 1.

The controller 100 may visualize the current position information of the mobility device 1 determined by using the AR marker and an AR content corresponding to the AR marker that is present in a position near the mobility device 1, and display the visualized information on the display 130.

The controller 100 may receive a selection input that is from a user to select whether the first position information detected using the position detector 110 is determined as the final position information or the second position information determined using the AR marker is determined as the final position information.

The controller 100 may determine a method for displaying the final position information based on the selection input received from the user.

When the user inputs a selection in which the final position information is determined using both of the first position information and the second position information, the controller 100 may determine the final position information by applying the second position information determined using the AR marker to the first position information detected using the position detector 110.

The controller 100 may detect the speed through the speed detector 120 of the mobility device 1.

Based on the current speed of the mobility device 1, the controller 100 may identify whether the AR marker is present within a predetermined range around the current position of the mobility device 1.

For example, when the current speed of the mobility device 1 is less than or equal to a predetermined speed, the controller 100 may periodically identify the position information of the AR marker. The predetermined speed may be 20 km/h, but is not limited thereto. At this time, the mobility device 1 may be in a stopped state or in a low-speed driving state because a condition for extracting the AR marker is a case in which the mobility device 1 is in a stopped state or a case in which the speed of the mobility device 1 is less than or equal to the predetermined speed (e.g., low-speed driving).

When the current speed of the mobility device 1 is less than or equal to the predetermined speed, the controller 100 may extract the AR marker, which is identified in real time in the predetermined range, based on the first position information of the mobility device 1 detected using the GPS.

The controller 100 may determine position information corresponding to the extracted AR marker in real time. The controller 100 may correct the first position information of the mobility device 1 by applying the second position information determined using the position information corresponding to the AR marker.

When the current speed of the mobility device 1 is greater than the predetermined speed, the controller 100 may determine the final position information by using the first position information obtained through the GPS. When the speed of the mobility device 1 is greater than or equal to the predetermined speed, it is difficult to extract the AR marker due to the high speed.

When the mobility device 1 is in the stopped state, the controller 100 may correct the current first position information of the mobility device 1 by applying the second position information determined using the AR marker to the first position information detected using the position detector 110.

The controller 100 may determine an accuracy of the first position information of the mobility device 1 detected using the position detector 110, and the second position information of the mobility device 1 determined using the AR marker. The controller 100 may select position information with a high accuracy based on the accuracy, and may determine the selected position information as the final position information.

For example, the controller 100 may periodically extract an AR marker within the predetermined range based on the first position information, and periodically determine position information corresponding to the AR marker. Accordingly, it is possible to increase the accuracy of the current position information of the mobility device 1 through comparison of the position information of the AR marker that is periodically changed.

For example, the controller 100 may identify a relative distance between the first position information of the mobility device 1 detected through the position detector 110 and the second position information of the mobility device 1 determined using the AR marker.

Based on the relative distance, the controller 100 may determine the accuracy of the first position information of the mobility device 1 detected using the position detector 110, and the second position information of the mobility device 1 determined using the AR marker.

Further, based on the accuracy, the controller 100 may determine the final position information by applying the second position information to the first position information.

The controller 100 may control the display 130 to display the final position information.

The controller 100 may periodically update the final position information and store the final position information in a memory (not shown).

As mentioned above, by applying the second position information determined using the AR marker to the current first position information of the mobility device 1, it is possible to obtain a plurality of AR markers at a designated position (e.g., a point in which the speed of the mobility device 1 is reduced, such as an intersection). Accordingly, it is possible to prevent that the AR is not extracted from an image obtained by the camera 140, and thus it is possible to more accurately determine the position of the mobility device 1.

The display 130 may display the current position of the mobility device 1 using an augmented reality method.

Accordingly, by visualizing the AR content corresponding to the AR marker that is present around the position of the mobility device 1, it is possible to provide the convenience to a user.

The display 130 may display the final position information that is corrected by applying the second position information determined using the AR marker of the mobility device 1.

Further, the display 130 may display a point of interest (POI) around the displayed final position information. For example, the POI may refer to position information of a building around a road, which allows a user to easily find a destination. Further, the display 130 may display various contents corresponding to a region of interest based on the POI.

The display 130 may be a cathode ray tube (CRT), a digital light processing (DLP) panel, a plasma display panel, a liquid crystal display (LCD) panel, an electroluminescence (EL) panel, an electrophoretic display (EPD) panel, an electrochromic display (ECD) panel, a light emitting diode (LED) panel or an organic light emitting diode (OLED) panel, but is not limited thereto.

The display 130 may be a touch display.

The memory (not shown) may be implemented as a separate chip, or may be implemented as a single chip with a processor corresponding to the controller 100.

A program that is to determine the driver's emotional state, gender, and age and stored in the memory (not shown) may include an artificial intelligence algorithm (an artificial neural network model), such as a convolutional neural networks (CNN) algorithm, a generative adversarial networks (GAN) algorithm, a recurrent neural networks (RNN) algorithm, a long short-term memory (LSTM) algorithm that is a type of RNN algorithm, and a region-based convolutional neural networks (R-CNN) algorithm.

To store various information, the memory (not shown) may be implemented as at least one of a non-volatile memory, such as a cache, a read only memory (ROM), a programmable ROM (PROM), an erasable programmable ROM (EPROM), an electrically erasable programmable ROM (EEPROM), and a flash memory, or a volatile memory, such as a random access memory (RAM), a hard disk drive (HDD), or a storage medium such as a CD-ROM, but is not limited thereto.

The controller 100 may be implemented as a memory configured to store an algorithm for controlling an operation of components in the mobility device 1 or data related to a program reproducing the algorithm, and a processor (not shown) configured to perform the above-mentioned operation by using the data stored in the memory. In this case, the memory and the processor may be implemented as separate chips. Alternatively, the memory and the processor may be implemented as a single chip.

Figure 2:
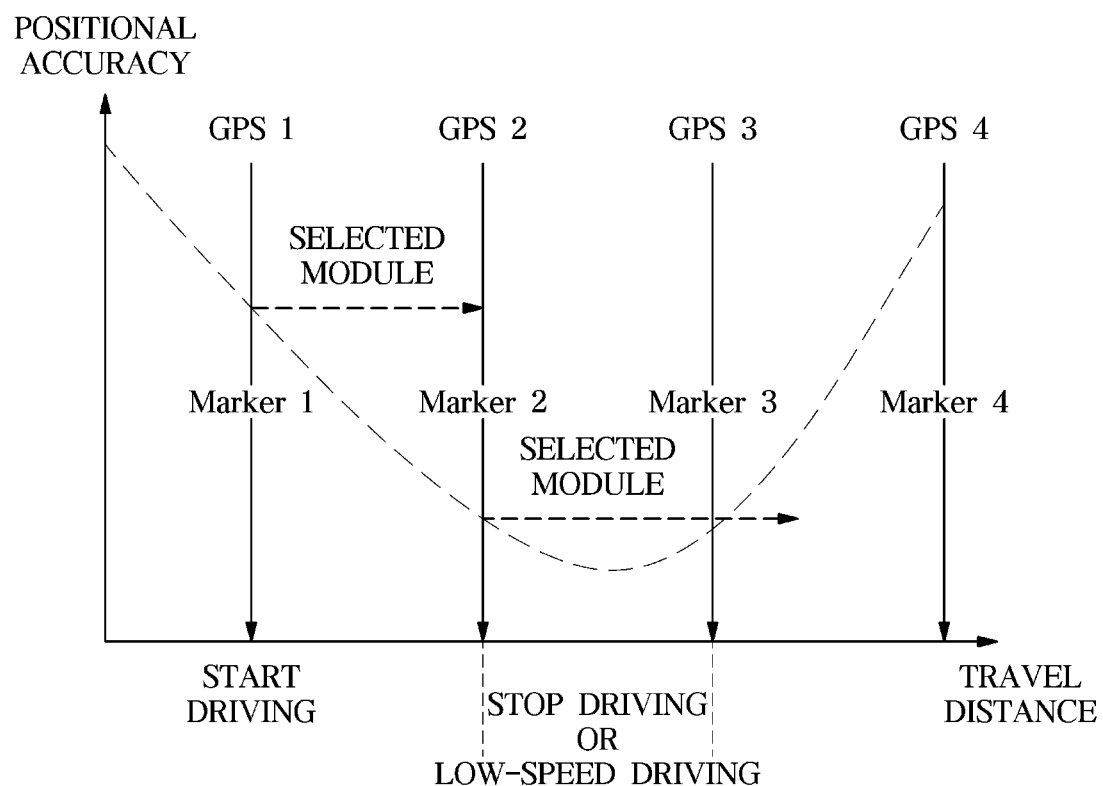
FIG. 2 is a reference graph for determining position information of the mobility device according to an embodiment of the disclosure.

FIG. 2 is a reference graph for determining position information of the mobility device according to an embodiment of the disclosure.

Referring to FIG. 2, the mobility device 1 may determine the final position information of the mobility device 1 by selecting one method between a method of determining a current position of the mobility device 1 by using information obtained through the GPS, an IMU, and a gyroscope sensor, and a method of determining a position corresponding to an AR marker through AR environment recognition that is pre-established.

Alternatively, the mobility device 1 may determine the final position information of the mobility device 1 by synthesizing the two methods.

Particularly, as illustrated in FIG. 2, when the mobility device 1 is in the stopped state or the low-speed driving state, the positional accuracy of determining the position of the mobility device 1 may be lowered.

Accordingly, when the mobility device 1 is in the stopped state or the low-speed driving state, it is possible to determine whether the AR marker is present in the predetermined range, based on current position information GPS2 and GPS 3 obtained using the position detector 110.

When the AR marker is present, the mobility device 1 may determine position information corresponding to the AR marker. The condition for extracting the AR marker is the case in which the mobility device 1 is in the stopped state or the case in which the speed of the mobility device 1 is less than or equal to the predetermined speed (e.g., low-speed driving), and thus when the mobility device 1 is in the stopped state or the low-speed driving state, it is possible to extract the AR marker.

In this time, the mobility device 1 may determine position information of the mobility device 1, which is determined based on the position information corresponding to the AR marker, as the final position information marker 2 and marker 3.

Further, the mobility device 1 may periodically detect the speed of the mobility device 1, and when the speed is less than or equal to the predetermined speed, the mobility device 1 may periodically extract the AR marker and determine position information corresponding to the AR marker.

As mentioned above, based on the accuracy of the position information corresponding to the AR marker, it is possible to correct the current position information by applying the position information of the mobility device 1, which is determined based on the position information corresponding to the AR marker, to the current position information detected using the position detector 110.

According to an embodiment, it has been described that the controller 100 determines the final position information by using one method or both methods between the method of detecting a current position of the mobility device 1 through the position detector 110, and the method of detecting a current position of the mobility device 1 determined based on a position corresponding to the AR marker through the AR environment recognition, which may be implemented as a first module for detecting a current position of the mobility device 1 through the position detector 110, and a second module for detecting a current position of the mobility device 1 determined based on a position corresponding to the AR marker through the AR environment recognition.

For example, based on the speed of the mobility device 1, the mobility device 1 may select one of the first module or the second module and control one of the first module or the second module to determine the final position information of the mobility device 1.

Further, based on the speed of the mobility device 1, the mobility device 1 may control both of the first module and the second module to apply position information, which is detected in the second module, to current position information detected in the first module.

Figure 3:
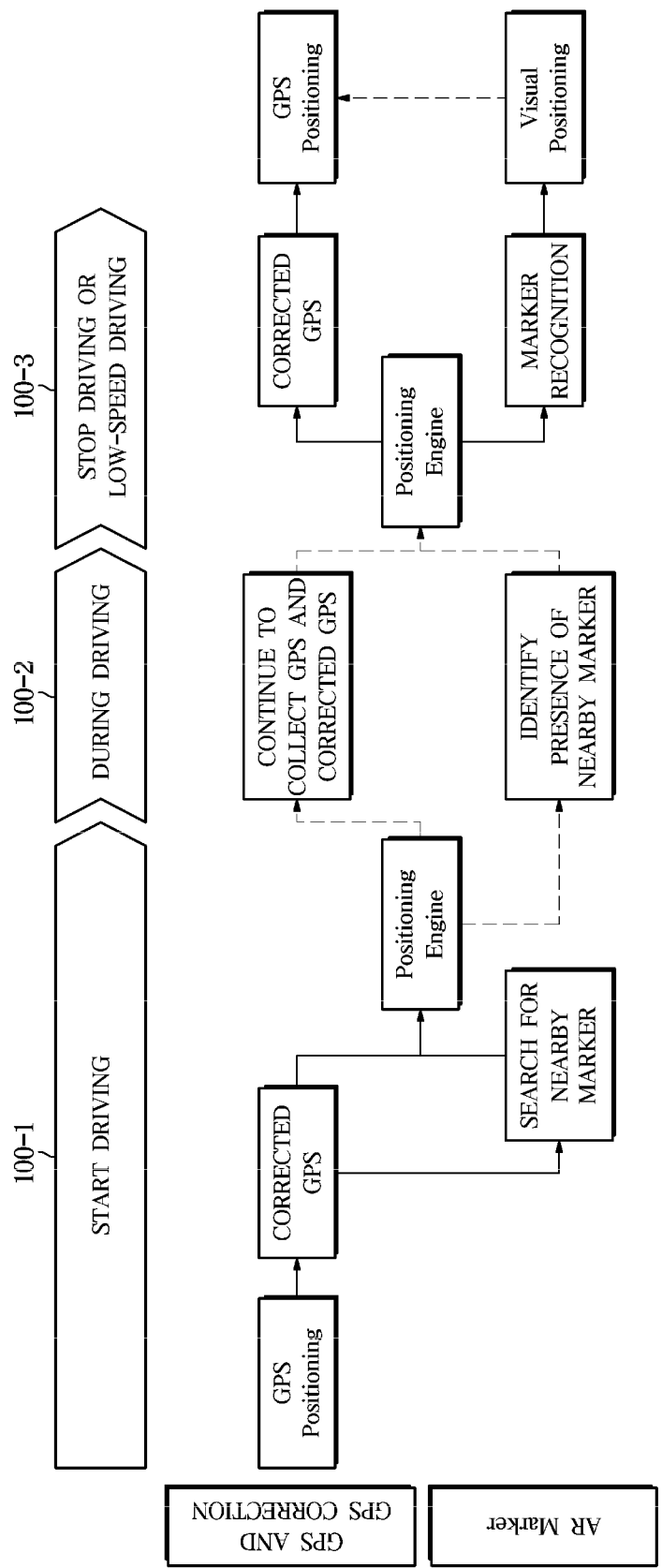
FIG. 3 is a diagram for determining position information of the mobility device according to an embodiment of the disclosure.

FIG. 3 is a diagram for determining position information of the mobility device according to an embodiment of the disclosure.

As illustrated in FIG. 3, when the mobility device 1 starts driving (100-1), the mobility device 1 may perform positioning on position information of the mobility device 1 by using the GPS. The mobility device 1 may extract the AR marker present within the predetermined range, based on the corrected GPS position information.

The mobility device 1 may extract the AR marker, and the mobility device 1 may determine the current position of the mobility device 1 based on the position information corresponding to the AR marker, and the mobility device 1 may control a positioning engine to apply the position information, which is obtained using the AR marker, to the position information of the mobility device 1 determined through the GPS.

When the mobility device 1 drives (100-2), the mobility device 1 may periodically obtain the position information of the mobility device 1 that is detected from the corrected GPS position information through the positioning engine.

The mobility device 1 may determine whether the AR marker is present within the predetermined range based on the corrected GPS position information.

When the mobility device 1 is in the stopped state or the low-speed driving state (100-3), the mobility device 1 may control the positioning engine to perform visual positioning through the extraction of the AR marker and the corrected GPS position information.

As described above in FIG. 2, the mobility device 1 may include the first module for detecting the current position of the mobility device 1 through the GPS, and the second module for detecting the current position of the mobility device 1 determined based on the position corresponding to the AR marker through the AR environment recognition. In this case, when the mobility device 1 drives at a high speed, the mobility device 1 may provide the GPS position information, which is detected by the first module, to the second module for AR implementation.

That is, when the mobility device 1 is in the stopped state or the low-speed driving state, the mobility device 1 may determine the final position information by applying the position information corresponding to the AR marker detected by the second module to the position information detected by the first module. Further, when the mobility device 1 drives at the high speed, the mobility device 1 may provide the position information, which is detected through the GPS in the first module, to the second module.

Figure 4:
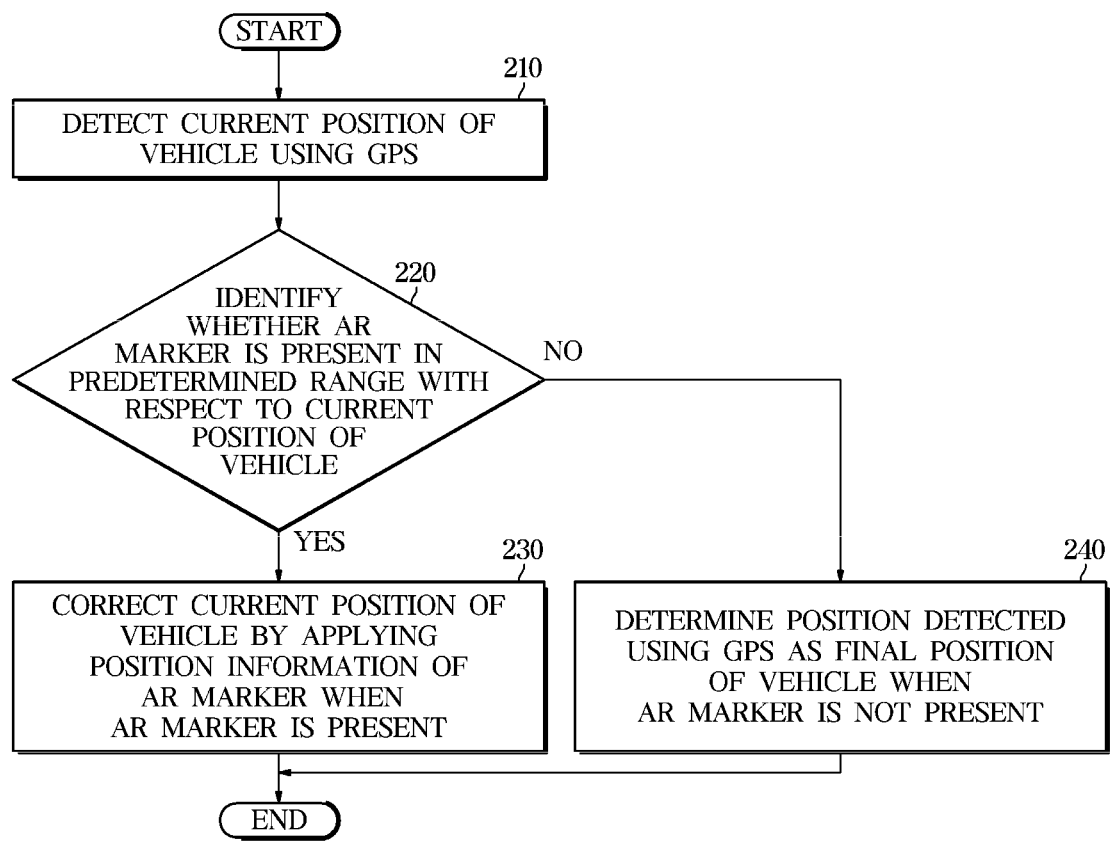
FIG. 4 is a flowchart illustrating a method for determining position information of the mobility device according to an embodiment of the disclosure.

FIG. 4 is a flowchart illustrating a method for determining position information of the mobility device according to an embodiment of the disclosure.

Referring to FIG. 4, the mobility device 1 may detect current position information of the mobility device 1 using the GPS (210).

The mobility device 1 may identify whether the AR marker is present within the predetermined range with respect to the current position, based on the current position information of the mobility device 1 (220).

For example, the mobility device 1 may set a radius of 30 m or less based on the current position as the predetermined range.

When the AR marker is present within the predetermined range, the mobility device 1 may extract the AR marker. The mobility device 1 may determine position information corresponding to the extracted AR marker.

The mobility device 1 may determine current position information of the mobility device 1 based on the position information corresponding to the AR marker.

The mobility device 1 may apply the position information of the mobility device 1 determined using the AR marker to the current position information of the mobility device 1 detected using the GPS. The mobility device 1 may correct the current position information (230).

When the AR marker is not present in the predetermined range, the mobility device 1 may determine the final position of the mobility device 1 based on the position information detected using the GPS (240).

Accordingly, during the low-speed driving state that allows the AR environment to be implemented, the AR marker is extracted and the position information corresponding to the extracted AR marker is applied to the current position information, and thus it is possible to identify the position of the mobility device more accurately.

FIG. 5 is a flowchart illustrating a method for determining position information of the mobility device according to another embodiment of the disclosure.

Referring to FIG. 5, the mobility device 1 may detect current position information of the mobility device 1 using the GPS (310).

The mobility device 1 may detect a current speed of the mobility device 1 (320).

The mobility device 1 may identify whether the AR marker is present within the predetermined range based on the current position information of the mobility device 1 detected using the GPS (330).

When the speed of the mobility device 1 is less than or equal to the predetermined speed in the state in which the AR marker is present, the mobility device 1 may periodically extract the AR marker. The mobility device 1 may periodically determine the position information corresponding to the extracted AR marker (340). Because the condition for extracting the AR marker is the case in which the mobility device 1 is in the stopped state or the case in which the speed of the mobility device 1 is less than or equal to the predetermined speed (e.g., low-speed driving), the mobility device 1 may be in the stopped state or in the low-speed driving state.

Based on the current speed of the mobility device 1, the mobility device 1 may determine whether or not to apply the current position information of the mobility device 1, which is determined based on the position information corresponding to the AR marker, to the current position information detected using the GPS (350).

When the current speed of the mobility device 1 is less than or equal to the predetermined speed, the mobility device 1 may correct the current position information by applying the current position information of the mobility device 1 determined using the AR marker to the current position information detected using the GPS (360).

According to the above-described embodiment, the first module that detects the current position of the mobility device 1 through the position detector 110 may be referred to as a sensor module, and the second module that detects the current position of the mobility device 1 determined based on the position corresponding to the AR marker through the AR environment recognition may be referred to as a marker module.

According to the above-described embodiment, the mobility device 1 may identify the current position of the mobility device 1 by selecting a module with a high accuracy among the sensor module and the marker module, or by synthesizing detection information of the two modules, that is the current position of the mobility device 1 detected through the position detector 110 and the current position of the mobility device 1 determined based on the position corresponding to the AR marker through the AR environment recognition.

For example, the mobility device 1 may identify the current position of the mobility device 1 by synthesizing the current position of the mobility device 1 detected through the GPS, and the current position of the mobility device 1 determined through the marker module about a location-based zone of the mobility device 1.

Further, according to the above-described embodiment, a condition for recognizing the AR marker is the case in which the mobility device 1 is in the stopped state or the case in which the mobility device 1 is in the low-speed driving state, and thus when the speed of the mobility device 1 is reduced or stopped, the mobility device 1 may continue to search for the AR marker.

For example, when the speed of the mobility device 1 is less than or equal to the predetermined speed due to the deceleration of the mobility device 1, the mobility device 1 may start to search for the AR marker.

Further, in addition to the above-described embodiment, when the mobility device 1 drives at the high speed, the mobility device 1 may identify the current position of the mobility device 1 by selecting the sensor module, and when the mobility device 1 drives at the low speed, the mobility device 1 may identify the current position of the mobility device 1 by giving a priority to the marker module upon recognizing the AR marker through the marker module.

As is apparent from the above description, when the mobility device is in the high-speed driving state in which it is difficult to implement the AR environment, the mobility device may obtain more accurate current position information by utilizing a position detection sensor.

Further, when the mobility device is in the low-speed driving state in which it is possible to implement the AR environment, the mobility device may extract the AR marker and apply position information, which is determined using the AR marker, to the current position information, thereby obtaining the more accurate position information of the mobility device.

Further, the mobility device may visualize the AR content corresponding to the AR marker present around the position of the mobility device, thereby providing convenience to the user.

Further, the mobility device may extract the AR marker by using the GPS position information based on the speed of the mobility device, and thus the mobility device may implement the approximate AR environment in the mobility device.

Meanwhile, the disclosed embodiments may be embodied in the form of a non-transitory recording medium storing instructions executable by a computer. The instructions may be stored in the form of program code and, when executed by a processor, may generate a program module to perform the operations of the disclosed embodiments. The non-transitory recording medium may be embodied as a non-transitory computer-readable recording medium.

The non-transitory computer-readable recording medium includes all kinds of recording media in which instructions which can be decoded by a computer are stored. For example, there may be a read only memory (ROM), a random access memory (RAM), a magnetic tape, a magnetic disk, a flash memory, and an optical data storage device.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A mobility device comprising:
 a position detector configured to detect a first current position of the mobility device, the position detector including at least one of a Global Positioning System (GPS), an Inertial Measurement Unit (IMU), or a 6 Degrees Of Freedom (6DoF) sensor;
 a speed detector configured to detect a speed of the mobility device;
 a display configured to display position information of the mobility device; and
 a controller including at least one processor configured to:
  in response to the speed of the mobility device detected by the speed detector being less than or equal to a predetermined speed, set first position information based on the first current position of the mobility device detected by the position detector,
  identify an augmented reality (AR) marker in a predetermined range, based on the first position information,
  set second position information based on a second current position of the identified AR marker, and
  correct the first position information by applying the second position information to the first position information when the mobility device is in a stopped state, and determine the corrected first position information as final position information of the mobility device, wherein, in response to the speed of the mobility device being greater than the predetermined speed, the controller is configured to determine the set first position information as the final position information of the mobility device.

2. The mobility device of claim 1, further comprising a camera, wherein, in response to a presence of the AR marker in an image acquired by the camera, the controller is configured to determine position information corresponding to the AR marker,
 wherein, in response to an absence of the AR marker in the image acquired by the camera, the controller is configured to determine the set first position information as the final position information of the mobility device.

3. The mobility device of claim 1, wherein the controller is configured to periodically determine position information of the AR marker.

4. The mobility device of claim 1, wherein the controller is configured to:
 determine an accuracy of the first position information and the second position information; and
 control the display to display position information with a high accuracy based on the accuracy.

5. The mobility device of claim 1, wherein the controller is configured to control the display to display the first position information or the second position information based on a selection input of a user.

6. A control method of a mobility device, the control method comprising:
 identifying a speed of the mobility device detected by a speed detector;
 setting, in response to the speed of the mobility device detected by the speed detector being less than or equal to a predetermined speed, a first current position of the mobility device detected by a position detector of the mobility device as first position information, wherein the position detector includes at least one of a Global Positioning System (GPS), an Inertial Measurement Unit (IMU), or a 6 Degrees Of Freedom (6DoF) sensor;
 identifying an augmented reality (AR) marker in a predetermined range based on the first position information;
 setting second position information of the mobility device based on a second current position of on the identified AR marker;
 correcting the first position information by applying the second position information to the first position information when the mobility device is in a stopped state;
 determining the corrected first position information as final position information of the mobility device; and
 determining, in response to the speed of the mobility device being greater than the predetermined speed, the set first position information as the final position information of the mobility device.

7. The control method of claim 6, further comprising:
determining, in response to a presence of the AR marker in an image acquired by a camera, position information corresponding to the AR marker; and
determining, in response to an absence of the AR marker in the image acquired by the camera, the set first position information as the final position information of the mobility device.

8. The control method of claim 6, further comprising periodically determining position information of the AR marker.

9. The control method of claim 6, further comprising:
determining an accuracy of the first position information and the second position information; and
displaying position information with a high accuracy based on the accuracy.

10. The control method of claim 6, further comprising:
receiving a selection input of the first position information or the second position information; and
displaying the first position information or the second position information based on the selection input.

11. A control method of a vehicle, the control method comprising:
detecting a current position of the vehicle using a global positioning system (GPS);
detecting a speed of the vehicle;
identifying whether an augmented reality (AR) marker is present within a predetermined range of the current position and identifying position information of the AR marker when the AR marker is present;
periodically identifying, in response to detected speed of the vehicle being less than or equal to a predetermined speed, position information of additional AR markers;
determining whether to apply the position information of the AR marker or the additional AR markers;
correcting the current position of the vehicle by applying the position information of the AR marker or the additional AR markers to the current position when the vehicle is in a stopped state; and
determining, in response to the speed of the vehicle being greater than the predetermined speed, the current position as final position information of the vehicle.

12. The control method of claim 11, further comprising, in response to determining the AR marker and the additional AR markers are not present, determining the current position of the vehicle using the GPS as a final position of the vehicle.

13. The control method of claim 11, further comprising obtaining a surrounding image of the vehicle using a camera.

14. The method of claim 13, wherein identifying whether the AR marker is present comprises determining whether the AR is present in the surrounding image.

15. The control method of claim 11, wherein detecting the speed of the vehicle comprises using a speed detector.

16. The control method of claim 11, further comprising:
determining an accuracy of the current position and the position information of the AR marker or the additional AR markers; and
controlling a display to display position information with a high accuracy based on the determined accuracy.

17. The control method of claim 11, further comprising controlling a display to display the current position or the position information of the AR marker or the additional AR markers based on a selection input of a user.

* * * * *

UNITED STATES PATENT AND TRADEMARK OFFICE
CERTIFICATE OF CORRECTION

PATENT NO. : 11,715,233 B2
APPLICATION NO. : 17/454413
DATED : August 1, 2023
INVENTOR(S) : Jae Yul Woo et al.

It is certified that error appears in the above-identified patent and that said Letters Patent is hereby corrected as shown below:

In the Claims

Claim 6, Column 12, Line 63; delete "fmal" and insert --final--.

Claim 7, Column 13, Line 7; delete "fmal" and insert --final--.

Signed and Sealed this
Twenty-sixth Day of September, 2023

Katherine Kelly Vidal
*Director of the United States Patent and Trademark Office*